United States Patent [19]

Iida

[11] 4,063,134

[45] Dec. 13, 1977

[54] RASTER DISTORTION CORRECTION CIRCUIT

[75] Inventor: Mikio Iida, Tokyo, Japan

[73] Assignee: Sony Corporation, Tokyo, Japan

[21] Appl. No.: 687,655

[22] Filed: May 19, 1976

[30] Foreign Application Priority Data

May 22, 1975 Japan .................................. 50-69040

[51] Int. Cl.² ............................................. H01J 29/56
[52] U.S. Cl. ................................................. 315/371
[58] Field of Search ................................ 315/370, 371

[56] References Cited

U.S. PATENT DOCUMENTS

| 2,304,057 | 12/1942 | Schade | 315/371 |
| 2,370,426 | 2/1945 | Schade | 315/371 |
| 2,661,443 | 12/1953 | Smith | 315/370 |
| 3,649,870 | 3/1972 | Maulsby | 315/371 |
| 3,748,531 | 7/1973 | Boekhorst et al. | 315/371 |
| 3,949,167 | 4/1976 | Koyama et al. | 315/370 |

Primary Examiner—T.H. Tubbesing
Assistant Examiner—T. M. Blum

Attorney, Agent, or Firm—Lewis H. Eslinger; Alvin Sinderbrand

[57] ABSTRACT

A raster distortion correction circuit for correcting both pincushion distortion and trapezoidal distortion of a raster on a cathode ray tube. A parabolic-shaped signal and a sawtooth-shaped signal, both having frequencies equal to the vertical deflection frequency, are supplied to the correction circuit. The amplitude and polarity of the sawtooth-shaped signal is selectivey adjusted, and the adjusted sawtooth-shaped signal is combined with the parabolic-shaped signal and supplied to a current modulator. A horizontal deflecting current flows through the modulator and is thus modulated by the combined parabolic-shaped signal and adjusted sawtooth-shaped signal, the modulated horizontal deflecting current being supplied to a horizontal deflection coil included in the horizontal deflection circuit for the cathode ray tube. The parabolic-shaped signal component corrects the pincushion distortion and the adjusted sawtooth-shaped component corrects the trapezoidal distortion.

14 Claims, 11 Drawing Figures

RASTER DISTORTION CORRECTION CIRCUIT

BACKGROUND OF THE INVENTION

This invention relates to a raster distortion correction circuit and, more particularly, to such a circuit for correcting both pincushion distortion and trapezoidal distortion of a raster on a cathode ray tube.

In cathode ray tubes (CRT) of the type used in large-screen video displays, such as a television receiver, the so-called pincushion distortion of the raster on the CRT display screen often is present. This pincushion distortion is due to the fact that the CRT electron beam scans the display screen at a constant angular velocity but, since the screen is flat, the beam must move across a larger distance per time unit interval at the corners of the screen than at the center portion thereof. That is, if the trace of the beam is divided into equal angular increments as the beam scans from one side to the other of the viewing screen, the length of the beam from its deflection center to the screen is greater at the corner than at the center portion of the screen, resulting in a larger beam displacement for an angular increment at the corner than at the central portion of the screen. Of course, if the screen is curved such that the length of the beam from its deflection center to the screen is equal for all angular increments, the beam displacement at the screen is equal for all angular increments, regardless of whether the beam impinges at the corner or central portion thereof. Stated otherwise, since the beam has a constant deflection velocity, i.e., a constant angular velocity, its linear velocity across a flat screen is greater at the corners thereof than at the central portion. This difference in linear velocity, or displacement increment, results in the so-called pincushion distortion of the raster.

Various techniques have been proposed heretofore for correcting such pincushion raster distortion. For example, in one proposed technique, the power supply voltage for the horizontal deflection circuit of the CRT is varied, or modulated, by a parabolic-shaped signal having a frequency equal to the vertical deflection frequency of the CRT. Another technique for correcting pincushion distortion in a large-screen CRT, that is, in a CRT having a relatively large side-to-side beam deflection angle, is described in U.S. Pat. No. 3,968,402, assigned to the same assignee as the instant invention.

Another form of raster distortion in a CRT display is the so-called trapezoidal distortion. Trapezoidal distortion is due to the correcting apparatus used to correct for electron beam mislanding caused by the magnetic field of the earth. That is, it has been found that when a CRT display screen faces a particular compass direction, the earth's magnetic field affects the beam such that it does not land at the proper location on the CRT screen or on a shadow mask which may be used therewith. This beam mislanding is not uniform; rather, it is a function of the direction in which the CRT screen is facing. While correcting apparatus is known to correct for such beam mislanding, such apparatus results in the trapezoidal distortion of the raster. That is, typically, this correcting apparatus vertically displaces the effective deflection center of the beam so that with this "new" deflection center, the beam lands at the correct location. However, because of this displacement in the beam deflection center, the resultant raster exhibits a trapezoidal-shaped distortion.

OBJECTS OF THE INVENTION

Therefore, it is an object of the present invention to provide an improved raster distortion correction circuit for use in a CRT.

Another object of this invention is to provide a raster distortion correction circuit for correcting both pincushion distortion and trapezoidal distortion of a raster.

A still further object of this invention is to provide an improved raster distortion correction circuit for correcting pincushion and trapezoidal distortions in a CRT wherein the electron beam has a relatively large deflection angle.

An additional object of this invention is to provide a raster distortion correction circuit for correcting pincushion distortion and trapezoidal distortion, the latter being a function of the particular direction in which the display screen of the CRT is facing.

Various other objects, advantages and features of this invention will become readily apparent from the ensuing detailed description, and the novel features will be particularly pointed out in the appended claims.

SUMMARY OF THE INVENTION

In accordance with this invention, a raster distortion correction circuit is provided for correcting both pincushion distortion and trapezoidal distortion of a raster on a CRT wherein parabolic-shaped and sawtooth-shaped signals, each having a frequency equal to the vertical deflection frequency of the CRT, are supplied to a control circuit, the control circuit including a selectively adjustable circuit to adjust the amplitude and polarity of the sawtooth-shaped signal as a function of the direction in which the CRT display screen is facing, a horizontal deflection circuit applies a horizontal deflecting current through a horizontal deflection coil for the CRT, and a modulator is connected to the control circuit for receiving both the parabolic-shaped signal and the adjusted sawtooth-shaped signal to modulate the horizontal deflecting current with these signals.

It is one advantageous feature to enable trapezoidal distortion, caused by the correction of electronic beam mislanding due to the earth's magnetic field, to be corrected regardless of the direction in which the CRT display screen faces merely by correspondingly adjusting the selectively adjustable circuit so as to appropriately vary the sawtooth-shaped signal.

BRIEF DESCRIPTION OF THE DRAWINGS

The following detailed description, given by way of example, will best be understood in conjunction with the accompanying drawings in which.

DETAILED DESCRIPTION OF CERTAIN ONES OF THE PREFERRED EMBODIMENTS

Figure 1:
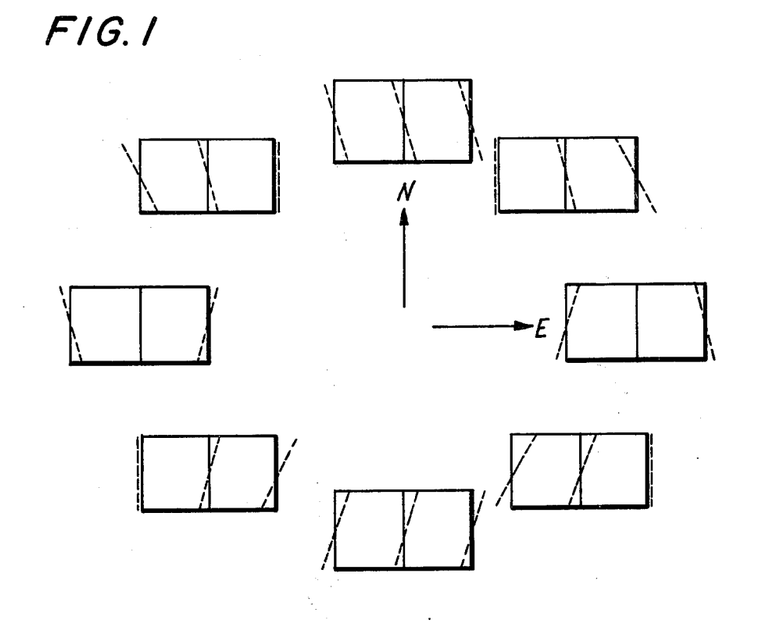
FIG. 1 diagrammatically represents the trapezoidal distortion of a CRT raster which is a function of the direction in which the CRT display screen faces.

The advantages achieved by the present invention will be readily recognized once the problem of trapezoidal distortion of a raster is appreciated. This is diagrammatically represented in FIG. 1. As is known, the magnetic field of the earth influences the electron beam in a CRT. These influences result in the beam not landing at proper locations on the screen or apertured electrode, such as a shadow mask, of the CRT. Furthermore, depending upon the direction of the beam in respect to the earth's magnetic field, the resultant beam mislanding differs as the orientation of the CRT changes. That is, if the CRT display screen faces, for example, in the north direction, the beam mislanding caused by the earth's magnetic field differs from the beam mislanding when the CRT display screen faces in the south direction. Similarly, beam mislandings caused by the earth's magnetic field when the CRT display screen faces in the east and west directions, respectively, are different and also differ from the beam mislandings when the screen faces in the north and south directions. As is expected, the east, west, north and south mislandings interact when the CRT display screen faces northeast, northwest, etc. These resultant mislandings are depicted in FIG. 1 wherein the solid lines depict the proper landings of the electron beam across the raster and the broken lines represent the mislandings of the beam for the respective directions in which the CRT display screen may face. As shown, the beam at the left-most portion of the raster when the screen faces in the northeast and southwest directions lands at its proper location, and the beam at the right-most portion of the raster when the screen faces in the northwest and southeast directions also lands at its proper location. However, at other portions of the raster and at other screen-facing directions, the electron beam is influenced by the earth's magnetic field to not land properly.

Figure 2:
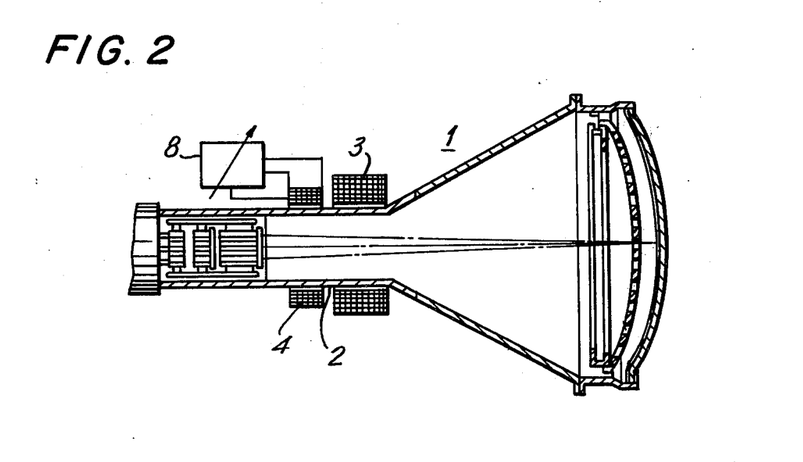
FIG. 2 is a schematic illustration of a CRT including beam mislanding correcting apparatus.

The aforenoted beam mislandings are most noticeable when the electron beam undergoes a relatively wide deflection angle. In many large-screen television receivers, the electron beam is deflected through a large angle. However, the beam mislandings can be corrected for a given orientation of the CRT, and it is expected that such orientation of large-screen television receivers normally will not be changed. One example of beam mislanding correcting apparatus which may be used with such large-screen television receivers is shown in FIG. 2 wherein the neck portion 2 of a CRT 1, such as a color cathode ray tube, is provided with a deflection yoke 3 and a dynamic correcting coil 4. Coil 4 is adapted to correct for beam mislandings and, as shown, is disposed upstream of deflection yoke 3 relative to the electron beam. A controllable source 8 of correcting current is coupled to correcting coil 4 and is adapted to supply a suitable correcting current thereto, depending upon the orientation of CRT 1 and the direction in which the CRT display screen faces.

Figure 3:
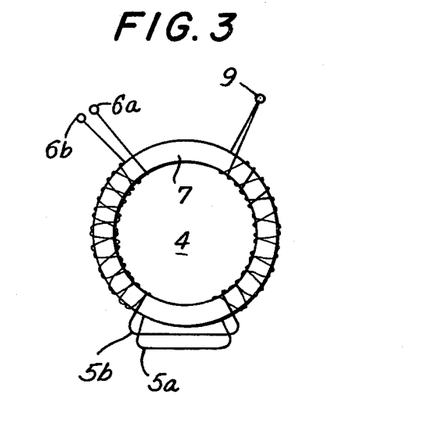
FIG. 3 illustrates one example of beam mislanding correcting apparatus which can be used in the CRT of FIG. 2.

One embodiment of correcting coil 4 is depicted in FIG. 3 as comprising first and second windings 5a and 5b wound in opposite directions about an annular, or ring-shaped core 7. Winding 5a is provided with an input terminal 6a and winding 5b is provided with an input terminal 6b. The output terminals of these windings are connected to a common terminal 9, and signal source 8 is adapted to supply correcting currents through the coils between input terminals 6a, 6b and output terminal 9. Depending upon the direction in which the CRT display screen faces, the correcting current is applied to coil 5a or to coil 5b or correcting current components are supplied to both coils.

Figure 5A:
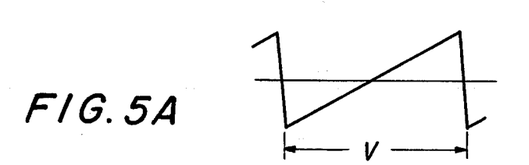
FIGS. 5A–5C are waveform representations of beam mislanding correcting signals applied to the apparatus of FIGS. 2 and 3.
Figure 5B:
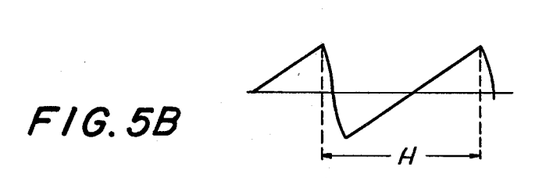
Figure 5C:
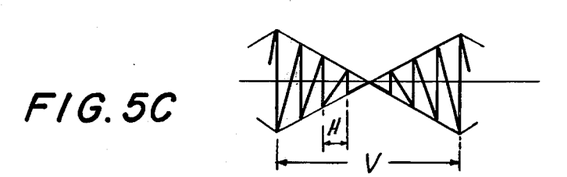

The correcting current supplied to coils 5a and 5b by source 8 may be of the type having waveforms shown in FIG. 5A, 5B or 5C. For example, if CRT 1 is aligned such that its display screen faces in the north direction, source 8 applies a sawtooth current signal having a frequency equal to the vertical deflection rate of CRT 1 to, for example, coil 5a. This sawtooth-shaped current signal may have a waveform of the type shown in FIG. 5A. When this current flows through coil 5a, the beam mislanding caused by the earth's magnetic field is corrected.

If CRT 1 is aligned such that its display screen faces in the south direction, the correcting current having the waveform shown in FIG. 5A is applied by source 8 to coil 5b.

As another example, if CRT 1 is aligned such that its display screen faces in the east direction, source 8 supplies a correcting current signal having the sawtooth-shaped waveform shown in FIG. 5B, this current signal having a frequency equal to the horizontal deflection frequency of CRT 1. Furthermore, this correcting current signal, as shown in FIG. 5B, is amplitude modulated by a sawtooth-shaped current of the vertical deflection frequency, such as the current waveform shown in FIG. 5A, thereby to produce an amplitude modulated correcting signal having the waveform shown in FIG. 5C. This correcting signal then is applied by source 8 to correcting coil 5a. Conversely, if CRT 1 is aligned such that its display screen faces in the west direction, the correcting signal having the waveform shown in FIG. 5C now is applied to correcting coil 5b.

If CRT 1 is aligned in the northeast, northwest, etc. direction, source 8 applies combinations of the correcting signals shown in FIGS. 5A and 5C to coils 5a and 5b. The particular coils which are supplied with the respective correcting signals and the relative amplitudes of the correcting signals depends upon the particular orientation of the CRT 1.

In this manner, coil 4 functions as a dynamic mislanding correcting coil so as to correct electron beam mislandings due to the earth's magnetic field. This correction is diagrammatically represented in FIG. 4 which, for the purpose of simplification, depicts a vertical deflection coil 11, a dynamic beam landing correcting coil 10, an apertured electrode, such as a shadow mask 12, and a display screen 13, all included in a CRT. Consistent with the representation of FIG. 2, correcting coil 10 is located upstream of deflection coil 11, relative to the electron beam.

Figure 4:
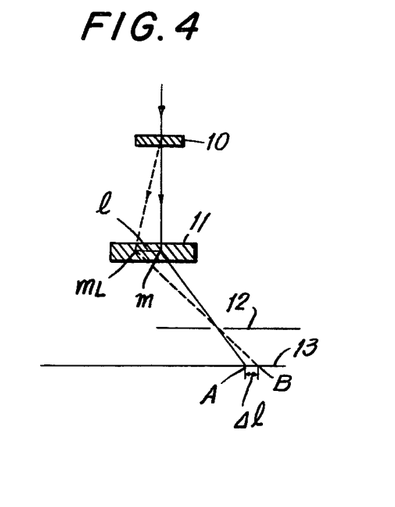
FIG. 4 is a schematic representation of the manner in which beam mislanding caused by the earth's magnetic field is corrected by the apparatus of FIG. 3.

The path traversed by the electron beam in the absence of a mislanding correcting field is represented by the solid line. As shown, the beam passes through the center m of deflection coil 11 and then through the aperture, or shadow mask 12, to impinge screen 13 at point A. However, this beam landing location A differs from the proper landing location B by an amount $\Delta l$ because of the influence upon the electron beam by the earth's magnetic field. Accordingly, correcting coil 10 is supplied with a correcting current of the type described hereinabove in order to shift the landing location of the electron beam so that it impinges at its proper location B. When the correction current is applied to correcting coil 10, the magnetic field produced thereby displaces the beam such that it no longer passes through the center $m$ of deflection coil 11. Thus, the effective deflection center of the electron beam is shifted, or displaced, by an amount $l$ to form a new effective deflection center at $m_L$. Now, from this new deflection center $m_L$, the electron beam properly lands at location B on screen 13.

Figure 6:
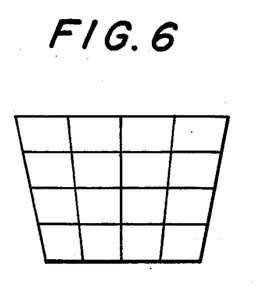
FIGS. 6 and 7 illustrate trapezoidal distortion of the CRT raster.
Figure 7:
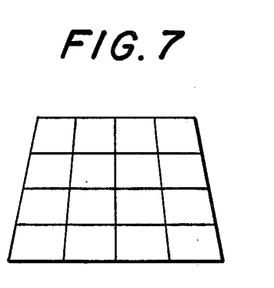

FIG. 4 may be considered to be a top view of a color cathode ray tube and deflection coil 11 is the vertical deflection coil. Hence, as the electron beam scans toward the center of the screen, the shifting of the effective deflection center of the beam from point $m$ to point $m_L$ decreases; that is, the center displacement $l$ decreases. Then, as the beam continues to scan toward, for example, the bottom of screen 13, the effective displacement center $m_L$ is displaced in an opposite direction, that is, to the right in FIG. 4, from center point $m$. Although this shifting of the effective deflection center of the electron beam corrects for beam midlanding due to the earth's magnetic field, the raster traced by this beam exhibits a trapezoidal-shaped distortion. This distortion is most noticeable when the CRT is aligned in an east or west direction, the resultant trapezoidal distortion appearing as shown in FIGS. 6 and 7. Another source of the illustrated trapezoidal distortion is the deflecting field generated by the deflection yoke.

Figure 8:
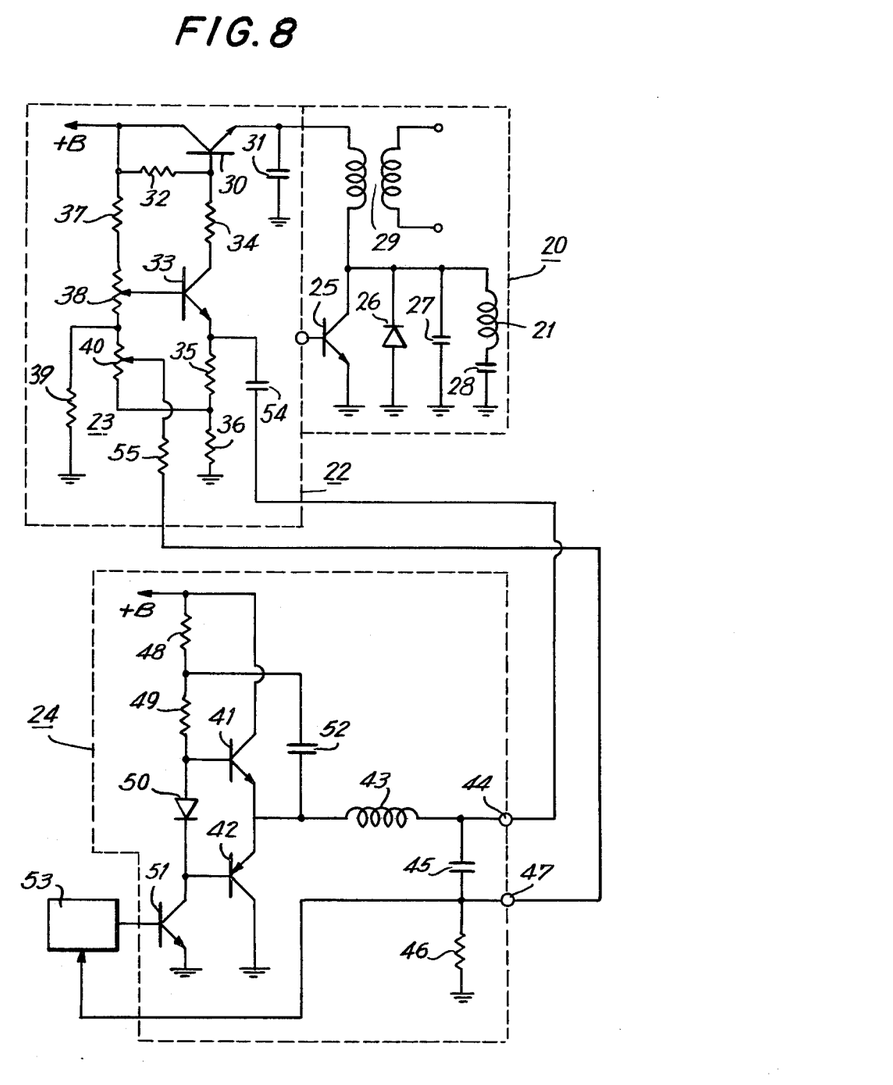
FIG. 8 is a schematic diagram of one embodiment of the present invention.

Referring now to FIG. 8, there is schematically illustrated one embodiment of a distortion correcting circuit which corrects the trapezoidal distortion, discussed in detail hereinabove, and pinchushion distortion that is produced when the electron beam undergoes a relatively large deflection angle, as described previously. The illustrated embodiment is comprised of a horizontal deflection circuit 20, a distortion correction circuit 22 connected to the horizontal deflection circuit and a vertical deflection circuit 24 for supplying signals of the vertical deflection frequency to correction circuit 22. Horizontal deflection circuit 20 includes a horizontal deflection coil 21 through which a horizontal deflecting current is transmitted. The horizontal deflection circuit includes a switching transistor 25 whose collector-emitter circuit is connected in parallel with a damper diode 26 and, additionally, a capacitor 27. These parallel-connected elements are further connected in parallel with a series circuit formed of horizontal deflection coil 21 and an S-shaping capacitor 28. As is conventional, a horizontal output transformer 29 is connected in series with this parallel circuit. Accordingly, when a switching signal is applied to the base electrode of switching transistor 25, a horizontal deflecting current flows through transformer 29 and horizontal deflection coil 21, thereby to deflect the electron beam across a horizontal line.

The horizontal deflecting current is supplied to transformer 29 by correction circuit 22, the latter being adapted to modulate the horizontal deflecting current with a distortion correcting signal. To this effect, the collector-emitter circuit of a transistor 30 is provided in series with the horizontal deflecting current circuit. Hence, transistor 30 is used as variable impedance device having its collector electrode connected to a power supply +B and its emitter electrode connected in series with transformer 29. The emitter electrode of transistor 30 additionally is coupled to a reference potential, such as ground, by a capacitor 31.

The base electrode of transistor 30 is connected through a bias resistor 32 to power supply +B. In addition, the base electrode of transistor 30 is adapted to receive a control signal to vary the collector-emitter impedance thereof and correspondingly modulate the horizontal deflecting current. This control signal is applied by a transistor 33 through a resistor 34 to the base electrode of transistor 30. As shown, the emitter electrode of transistor 33 is connected to ground by series-connected resistors 35 and 36. The base electrode of this transistor is supplied with a bias potential by series-connected bias resistor 37, 38 and 39, these series-connected resistors being coupled between the power supply +B and ground. Preferably, resistor 38 is an adjustable resistance, such as a potentiometer, whose movable tap is connected to the base electrode of transistor 33. A resistance, preferably an adjustable resistance, interconnects the base and emitter circuits of transistor 33 and is connected between the junction defined by resistors 35 and 36 and the junction defined by resistors 38 and 39, respectively. In the preferred embodiement, resistor 40 is a potentiometer whose movable tap is supplied with a signal, such that a portion of this supplied signal is applied to the base circuit of transistor 33 and another portion of this supplied signal is applied to the emitter circuit of this transistor. By adjusting the tap of potentiometer 40, the relative portions of the supplied signal which are applied to the base and emitter circuits of transistor 33 can be correspondingly adjusted so as to vary the ratio therebetween. This, in turn, varies a corresponding component of the signal applied to transistor 30 by transistor 33. Accordingly, transistor 33 and its associated resistors, especially resistor 40, may be considered to be a varying circuit 23.

The signals supplied to correction circuit 22 by vertical deflection circuit 24 now will be described by discussing the construction of the vertical deflection circuit. Circuit 24 includes complementary transistors 41 and 42 having their respective emitter electrodes connected in common to form a single-ended push-pull (SEPP) circuit. The output of this SEPP circuit is connected through a vertical deflection coil 43, a capacitor 45 and a resistor 46 to ground. As may be appreciated, the SEPP circuit supplies a vertical deflecting current to vertical deflection coil 43, this current having a sawtooth waveform and a frequency equal to the vertical deflection frequency of the CRT. Accordingly, the SEPP circuit is driven by a vertical deflection oscillator 53 whose output is connected to a SEPP driving transistor 51. As shown, the collector-emitter circuit of transistor 51 is connected in series with bias resistors 48 and 49 and a diode 50, this series circuit being connected between power supply +B and ground. One electrode of diode 50, i.e., its anode, is connected to the base electrode of transistor 41 and its cathode is connected to the base electrode of transistor 42. Also, a capacitor 52 connects the junction defined by resistors 48 and 49 to the output of the SEPP circuit. In order to improve the linearity of the deflecting current through vertical deflection coil 43, negative feedback is provided from resistor 46 to vertical deflection oscillator 53.

The signal appearing at capacitor 45, that is, between the junction defined by vertical deflection coil 43 and the capacitor, is provided at an output terminal 44 which, in turn, is coupled by a capacitor 54 to the emitter electrode of transistor 33 in correction circuit 22. Thus, the sawtooth-shaped vertical deflecting current through vertical deflection coil 43 results in a sawtooth-shaped signal supplied to the emitter electrode of transistor 33. In addition, since capacitor 45 functions to integrate a portion of the sawtooth-shaped vertical deflecting current, a parabolic-shaped voltage is generated at terminal 44 and is superposed onto the sawtooth-shaped signal applied to the emitter electrode of transistor 33. Hence, terminal 44 applies a parabolic-shaped signal and a sawtooth-shaped signal component to the emitter electrode of transistor 33.

The sawtooth-shaped current flowing through vertical deflection coil 43 and capacitor 45 also flows through resistor 46. Hence, a sawtooth-shaped voltage is generated at terminal 47, resulting in a sawtooth-shaped signal component applied through a resistor 55 to the movable tap of resistor 40. A portion of this sawtooth signal component applied to resistor 40 is supplied to the base electrode of transistor 33 and another portion thereof is supplied to the emitter electrode of that transistor. Because of capacitor 54, the phase of the sawtooth signal component supplied through resistor 40 to the emitter electrode of transistor 33 is in phase with the sawtooth signal component supplied thereto by terminal 44. Hence, these respective sawtooth signal components are summed and, moreover, are in phase with the sawtooth signal component at the base electrode of transistor 33.

As is appreciated, the signal at the collector electrode of transistor 33 is a function of the base-emitter voltage thereof. Since no parabolic signal is applied to the base electrode of transistor 33, the collector signal thereof includes a parabolic signal component proportional to the parabolic signal produced at terminal 44. However, transistor 33 functions as a difference circuit in respect to the sawtooth signal such that the collector signal thereof includes a sawtooth signal component whose amplitude and polarity is proportional to the difference between the sawtooth signal components applied to the base and emitter electrodes of transistor 33. That is, if the sawtooth signal component at the transistor base electrode is greater than that at its emitter electrode, the polarity of the sawtooth signal component at the collector electrode is inverted. Conversely, if the sawtooth signal component at the transistor base electrode is less than that at its emitter electrode, the collector signal includes a sawtooth signal component having the same polarity as at the emitter electrode. The relative amplitudes of the sawtooth signal components at the base and emitter electrodes of transistor 33 can be adjusted by correspondingly adjusting the tap of potentiometer 40. That is, if the tap is moved upward, a greater sawtooth signal component is applied to the base electrode and, concurrently, a smaller sawtooth signal component is applied to the emitter electrode. Conversely, if the tap of potentiometer 40 is moved downward, the sawtooth signal component applied to the base electrode decreases and the sawtooth signal component applied to the emitter electrode increases.

The signal appearing at the collector electrode of transistor 33 is applied as a control signal to the base electrode of transistor 30. This control signal varies the collector-emitter impedance of transistor 30, whereby the horizontal deflecting current flowing therethrough is correspondingly modulated. Thus, the horizontal deflecting current is modulated with a parabolic signal to correct for pinchushion distortion; and the horizontal deflecting current is modulated with an adjustable sawtooth signal to compensate for trapezoidal distortion. Depending upon the amount of such trapezoidal distortion, the tap of potentiometer 40 is correspondingly adjusted to effect a proportional change in the modulating sawtooth signal.

If desired, the superposed parabolic and sawtooth signal components produced at terminal 44 may be subtracted from the sawtooth signal component produced at terminal 47, and the resultant subtracted signal applied to the base electrode of transistor 33.

Figure 9:
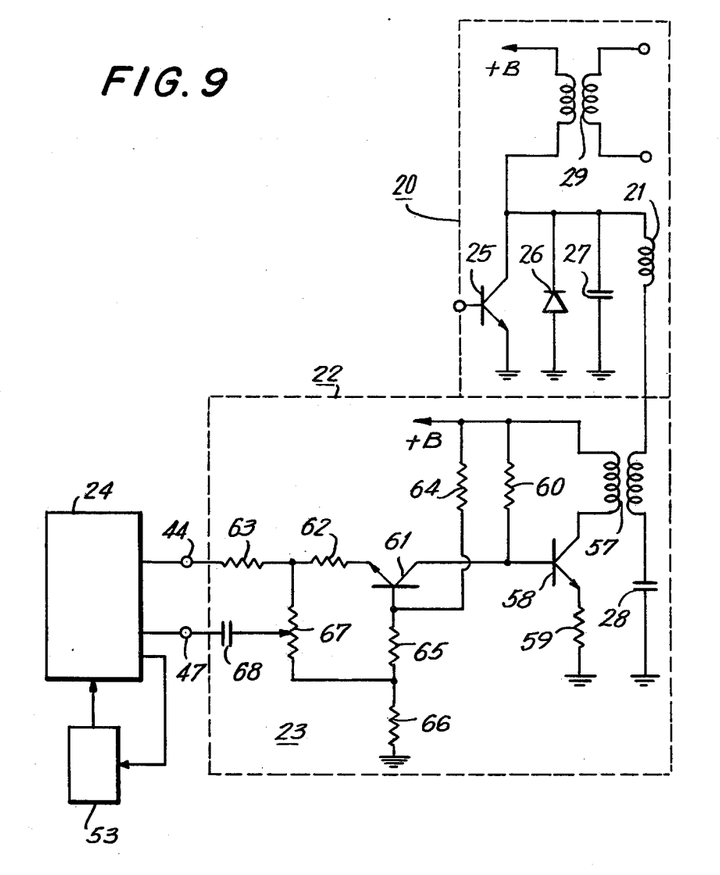
FIG. 9 is a schematic diagram of another embodiment of the present invention.

Referring now to FIG. 9, an alternative embodiment of a raster distortion correction circuit is illustrated wherein like reference numerals are used to identify the same components shown in the FIG. 8 embodiment. Thus, horizontal deflection circuit 20 is connected to correction circuit 22 and the correction circuit is supplied with the superposed parabolic and sawtooth signals produced at terminal 44 and the sawtooth signal produced at terminal 47. The correction circuit shown in FIG. 9 differs from that shown in FIG. 8 in that the variable impedance transistor 30 connected in series with horizontal deflection coil 21 is replaced by the secondary coil of a saturable reactor 57. The primary coil of saturable reactor 57 is connected in series with the collector-emitter of a transistor 58 and a resistor 59, this series circuit being connected between power supply +B and ground. A bias resistor 60 is connected to the base electrode of transistor 58. The collector-emitter impedance of transistor 58 is adapted to be varied so as to correspondingly vary the current flowing through saturable reactor 57. This, in turn, amplitude modulates the horizontal deflecting current flowing through horizontal deflection coil 21 and the secondary coil of the saturable reactor.

The impedance of transistor 58 is controlled by a varying circuit 23 which is similar to the aforedescribed varying circuit shown in FIG. 8. Thus, the base electrode of transistor 58 is connected to the collector electrode of a transistor 61, this latter transistor having its base electrode connected to a bias resistor 64 to power supply +B. In addition, the base electrode of transistor 61 is further connected through resistors 65 and 66 to ground. The base circuit of transistor 61 is adapted to be supplied with the sawtooth signal produced at terminal 47 and connected thereto through a capacitor 68 and a voltage-splitting resistor 67. Preferably, resistor 67 is a potentiometer whose movable tap is supplied with the sawtooth signal produced at terminal 47 and having one terminal connected to the junction defined by base resistors 65 and 66. The other terminal of potentiometer 67 is connected to the emitter circuit of transistor 61 so as to supply another portion of the sawtooth signal component produced at terminal 47 to the emitter electrode of transistor 61 through emitter resistor 62.

The superposed parabolic and sawtooth signal components produced at terminal 44 are supplied through a resistor 63 to emitter resistor 62 of transistor 61.

Therefore, as may be appreciated, the collector signal produced by transistor 61 is substantially similar to the collector signal produced by transistor 33 discussed hereinabove in respect to the FIG. 8 embodiment. That is, transistor 61 applies a control signal to transistor 58 having a parabolic-shaped component and a sawtooth-shaped component, the latter having an amplitude and polarity determined by the difference between the sawtooth signal components applied to the base and emitter electrodes of transistor 61. Consequently, this sawtooth-shaped component in the control signal applied to transistor 58 is selectively adjusted by positioning the tap of potentiometer 67 so as to correct for varying degrees of trapezoidal distortion. Hence, the collector-emitter impedance of transistor 58, and thus the current through the primary coil of saturable reactor 57 is varied as a function of the control signal produced by transistor 61. Consequently, the impedance of the secondary coil of saturable reactor 57 varies to correspondingly modulate the horizontal deflecting current through horizontal deflection coil 21. Thus, both pincushion and trapezoidal distortion of the raster are corrected.

While the present invention has been particularly shown and described with reference to preferred embodiments thereof, it will be readily apparent that various changes in form and details can be made by one of ordinary skill in the art without departing from the spirit and scope of this invention. Accordingly, it is intended that the appended claims be interpreted as including all such changes and modifications.

What is claimed is:

1. For use with a cathode ray tube of the type having trapezoidal distortion of the raster caused by beam mislanding correction means adapted to correct for beam mislanding caused by the magnetic field of the earth, a raster distortion correction circuit for correcting both pincushion distortion and said trapezoidal distortion of said raster, comprising:
   means for supplying a periodic parabolic signal having a parabolic waveform and a frequency equal to the vertical deflection frequency of said cathode ray tube;
   means for supplying plural periodic sawtooth signal components, each having a sawtooth waveform and a frequency equal to said vertical deflection frequency of said cathode ray tube;
   adjusting means for receiving said sawtooth signal components and producing an output sawtooth signal as a function of said supplied sawtooth signal components, said output sawtooth signal having adjustable amplitude and polarity for correcting said trapezoidal distortion caused by said beam mislanding correction means;
   a horizontal deflection circuit including a horizontal deflection coil for passing a horizontal deflecting current through said horizontal deflection coil at the horizontal deflection frequency of said cathode ray tube; and
   modulating means for receiving both said parabolic signal and said output sawtooth signal to modulate said horizontal deflecting current therewith, whereby said parabolic signal corrects said pincushion distortion and said adjusted sawtooth signal corrects said trapezoidal distortion.

2. The raster distortion correction circuit of claim 1 wherein said adjusting means comprises difference means having a first input for receiving a first sawtooth signal component and a second input for receiving a second sawtooth signal component to produce said output sawtooth signal having amplitude and polarity proportional to the difference between said first and second sawtooth signal components received at said first and second inputs.

3. The raster distortion correction circuit of claim 2 wherein said adjusting means further includes variable means for receiving one of said first and second sawtooth signal components and having first and second outputs coupled to said first and second inputs, respectively, of said difference means to variably adjust the relative amplitudes of the sawtooth signal components applied to said first and second inputs.

4. The raster distortion correction circuit of claim 3 wherein said difference means comprises transistor means having base and emitter electrodes for receiving said first and second respective sawtooth signal components to produce said output sawtooth signal at the collector electrode thereof; and said variable means is an adjustable impedance.

5. The raster distortion correction circuit of claim 4 further comprising means for interconnecting said parabolic signal supplying means and one of the base and emitter electrodes of said transistor means to supply said parabolic signal thereto and to additionally supply said first and second sawtooth signal components thereto; and means for interconnecting said sawtooth signal supplying means and said adjustable impedance to supply a portion of the sawtooth signal component supplied thereto through said adjustable impedance to the base electrode of said transistor means and to supply a portion of the other sawtooth signal component supplied thereto through said adjustable impedance to the emitter electrode of said transistor means.

6. The raster distortion correction circuit of claim 5 wherein said adjustable impedance is a potentiometer having a movable tap coupled to said sawtooth signal supply means; and first and second outputs coupled to the base and emitter electrodes, respectively, of said transistor means.

7. The raster distortion correction circuit of claim 1 wherein said modulating means comprises a controllable impedance; and means for applying said parabolic signal and said output sawtooth signal to a control terminal of said controllable impedance.

8. The raster distortion correction circuit of claim 7 wherein said adjusting means comprises difference means having a first input to receive a first sawtooth signal component, a second input to receive a second sawtooth signal component superposed on said parabolic signal, and an output coupled to said control terminal for controlling said controllable impedance with the difference between the signals received at said first and second inputs; and selectively adjustable means coupled to said first and second inputs for adjusting the relative amplitudes of said sawtooth signal components applied thereto.

9. The raster distortion correction circuit of claim 8 wherein said controllable impedance comprises the collector-emitter circuit of a transistor.

10. The raster distortion correction circuit of claim 8 wherein said controllable impedance comprises a saturable reactor.

11. The raster distortion correction circuit of claim 1 wherein said parabolic signal supplying means comprises a vertical deflection circuit including a vertical deflection coil through which flows a vertical deflecting current of sawtooth waveform; capacitance means coupled in series to said vertical deflection coil to produce a parabolic voltage proportional to the integral of said vertical deflecting current; and a supply terminal coupled to said capacitance means to supply said parabolic signal superposed on a sawtooth signal component.

12. The raster distortion correction circuit of claim 11 wherein said sawtooth signal supplying means comprises resistance means connected in series with said capacitance means; and a supply terminal coupled to the junction of said capacitance and resistance means to supply said sawtooth signal.

13. For use with a cathode ray tube of the type having pincushion distortion of the raster on its viewing screen and trapezoidal distortion of said raster caused by beam mislanding correction means, the latter means being adapted to correct for beam mislanding caused by the magnetic field of the earth, said mislanding correction being a function of the compass direction in which said viewing screen faces, apparatus for correcting both said pincushion distortion and said trapezoidal distortion of said raster, comprising:

first means for supplying a periodic parabolic signal having a parabolic waveform superposed on a first periodic sawtooth signal having a sawtooth waveform, said parabolic and first sawtooth signals each having a frequency equal to the vertical deflection frequency of said cathode ray tube;

second means for supplying a second periodic sawtooth signal having a sawtooth waveform and a frequency equal to said vertical deflection frequency;

variably adjustable control means coupled to said first and second means for receiving said parabolic signal and said first and second sawtooth signals and for variably adjusting the ratio between said sawtooth signals to produce a control signal having a parabolic signal component and a sawtooth signal component of amplitude and polarity proportional to said ratio;

a horizontal deflection circuit including a horizontal deflection coil for passing a horizontal deflecting current through said horizontal deflection coil; and variable impedance means responsive to said control signal to proportionately vary the impedance thereof for correspondingly modulating the horizontal deflecting current flowing therethrough.

14. The apparatus of claim 13 wherein said variably adjustable control means comprises transistor means having base and emitter electrodes; means for coupling said first means to one of said base and emitter electrodes; and adjustable signal dividing means coupled to said second means and having output terminals coupled to said base and emitter electrodes, respectively, said signal dividing means being adjustable as a function of said compass direction in which said viewing screen faces to correspondingly vary the sawtooth signal across said base and emitter electrodes and said sawtooth signal component of said control signal.

* * * * *